3,706,792
SUBSTITUTED PHENYLSULFONYLMETHYL SALICYLIC ACIDS AND ESTERS AND SALTS THEREOF
Tsung-Ying Shen, Bruce E. Witzel, and Gordon L. Walford, Westfield, N.J., assignors to Merck & Co., Inc., Rahway, N.J.
No Drawing. Continuation-in-part of application Ser. No. 836,641, June 25, 1969. This application Apr. 20, 1970, Ser. No. 30,291
Int. Cl. C07c 65/14
U.S. Cl. 260—520         4 Claims

ABSTRACT OF THE DISCLOSURE

Substituted (benzylthio)-salicylic acids, (phenylmercaptomethyl)-salicylic acids and phenyl disulfide salicylic acids and the non-toxic pharmaceutical accepted salts, esters, amides and various derivatives thereof. Also a method of treating inflammation which comprises administering the above compounds and various derivatives are also claimed. The substituted (benzylthio)-salicylic acids, (phenylmercaptomethyl)-salicylic acids and phenyl disulfide salicylic acids described herein have anti-inflammatory, anti-pyretic and analgesic activity.

CROSS REFERENCE TO RELATED APPLICATIONS

This application is a continuation-in-part of our copending U.S. application Ser. No. 836,641 filed June 25, 1969, now abandoned.

BACKGROUND OF THE INVENTION

The development of anti-inflammatory compounds in the past two decades has seen the growth of a great many new drugs. Most of these have been steroids of the 11-oxygenated pregnane series. These, while highly effective, have the drawback of causing many side effects. There is a need in the market for equally effective compounds of much simpler structure and having less side effects.

SUMMARY OF THE INVENTION

Generally this invention relates to new substituted (benzylthio)-salicylic acids, (phenylmercaptomethyl)-salicylic acids and phenyl disulfide salicylic acids and derivatives thereof and the use of these acids and their derivatives as a method of treating inflammation. Compounds covered by this invention are useful in that they have anti-inflammatory activity and are effective in the prevention and inhibition of edema and granuloma tissue formation. In addition, some of them have a useful degree of anti-pyretic, analgesic, diuretic, anti-fibrinolytic and hypoglycemic activity.

DESCRIPTION AND PREFERRED EMBODIMENTS

The invention relates to novel substituted (benzylthio)-salicylic acids, (phenylmercaptomethyl)-salicylic acids and phenyl disulfide salicylic acids and various derivatives thereof. More specifically, the invention relates to the following novel compounds as described in Formula I. Furthermore, the invention also relates to the use of these novel substituted (benzylthio)-salicylic acids, (phenylmercaptomethyl)-salicylic acids and phenyl disulfide salicylic acid in treating inflammation. These compounds are:

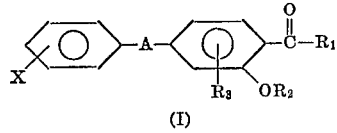

(I)

wherein $R_1$ may be hydroxy; amino; lower alkoxy (such as methoxy, ethoxy, butoxy, or pentoxy); loweralkylamino (such as methylamino, propylamino or pentylamino); di-(loweralkyl)amino (such as dimethylamino, dibutylamino, or propylpentylamino); diloweralkylaminoloweralkylamino; diloweralkylaminoloweralkoxy; hydroxyloweralkoxy (such as 3-hydroxypropoxy, 2-hydroxypropoxy, or 4-hydroxybutoxy); polyhydroxyloweralkoxy (such as 2,3-dihydroxypropoxy, 2,3,4,5,6-pentahydroxyhexyloxy); loweralkoxyloweralkoxy (such as ethoxyethoxy); phenyl loweralkoxy (such as benzyloxy, phenethoxy); phenoxy; substituted phenoxy (such as loweralkoxyphenoxy, diloweralkylaminophenoxy, halophenoxy or loweralkanoylaminophenoxy); loweralkanoylamino-loweralkoxy; anilino; hydrazino; hydroxylamino; N-morpholino; hydroxyloweralkyl amino and a naturally occurring amino acid radical with attachment at the N, such as glycine, phenylalanine, proline, methionine, taurine; etc.;

$R_2$ is hydrogen; acyl (preferably lower acyl such as formyl, acetyl, propionyl, butyryl, etc.); alkyl (preferably loweralkyl such as methyl, ethyl, propyl, isopropyl, butyl, pentyl, etc.); alkoxy carbonyl (preferably loweralkoxy carbonyl such as methoxycarbonyl, ethoxycarbonyl, hexoxycarbonyl, etc.) wherein the $OR_2$ group is always ortho to the COOH group;

$R_3$ is hydrogen; halogen (such as chloro, bromo, fluoro, or iodo, preferably fluoro or chloro); haloalkyl (preferably haloloweralkyl such as trifluoromethyl, etc.); alkyl (perferably loweralkyl, such as methyl, ethyl, propyl, isopropyl, butyl, pentyl, etc.); cycloalkyl (cyclobutyl, cyclopentyl, cyclohexyl, cycloheptyl etc.); alkoxy (preferably loweralkoxy such as methoxy, ethoxy, isopropoxy, butoxy, etc.); and X is hydrogen; alkyl; hydroxy; alkoxy (preferably loweralkoxy loweralkoxy such as methoxy, ethoxy, isopropoxy or butoxy, etc.); acyloxy (such as benzoyloxy, acetoxy, propionoxy etc.); halogen (such as chloro, bromo, fluoro or iodo, preferably fluoro or chloro); haloalkyl (preferably haloloweralkyl such as trifluoromethyl, etc.); nitro; amino; alkylamino (preferably lower alkylamino such as methylamino, propylamino, pentylamino, etc.); diloweralkylamino (preferably dimethylamino, dibutylamino, propylpentylamino, etc.); acylamino (preferably lower acylamino such as formylamino, acetylamino, propionylamino, butyrylamino, etc.); mercapto; alkylmercapto (preferably loweralkylmercapto such as methylmercapto, ethylmercapto, etc.); alkylsulfinyl (preferably loweralkylsulfinyl such as methylsulfinyl, ethylsulfinyl, butylsulfinyl, etc.); alkylsulfonyl (preferably loweralkylsulfonyl, such as methylsulfonyl, ethylsulfonyl); sulfonamido; sulfamyl; alkylaminoalkyl (preferably loweralkylamino-loweralkyl such as methylaminomethyl, ethylaminomethyl, etc.); dialkylaminoalkyl (preferably diloweralkylaminoloweralkyl such as diethylaminoethyl, etc.); hydroxyalkyl (preferably hydroxyloweralkyl such as hydroxymethyl, hydroxyethyl, hydroxypropyl, etc.); alkoxyalkyl (preferably loweralkoxyloweralkyl such as methoxymethyl, methoxyethyl, ethoxyethyl, ethoxypropyl, etc.); mercaptoalkyl (preferably mercaptoloweralkyl such as mercaptomethyl, mercaptoethyl, etc.); alkylmercaptoalkyl (preferably loweralkylmercaptoloweralkyl such as methylmercaptomethyl, ethylmercaptoethyl, ethylmercaptopropyl, etc.); cyano; carboxy; carboalkoxy (carbomethoxy, carboethoxy, etc.); carbamoyl; aryl (such as phenyl, tolyl, salicyl, halophenyl, etc.); aralkyl (such as benzyl), aryloxy; aralkoxy;

A is $-CH_2-S-$; $-CH_2-SO_2-$; $-CH_2-SO-$; $-S-CH_2-$; $-SO-CH_2-$; $-SO_2-CH_2-$; $-S-S-$, the A radical being connected to the 4 or 5 position of the salicylic acid moiety and the non-toxic pharmaceutically acceptable salts thereof.

Also the compounds of the above invention wherein X is fluoro, hydroxy, haloalkyl, mercapto, alkylmercapto, alkylsulfinyl, alkylsulfonyl, sulfonamido, sulfinylamido, aminoalkyl, alkylaminoalkyl, mercaptoalkyl, alkylmercaptoalkyl, carboalkoxy, carbamyl, aryl, aralkyl, aryloxy, aralkoxy, acetyl, are novel compounds and represent a preferred embodiment of this invention.

Preferred compounds of this invention which can be used are those of Formula I where $R_1$ is hydroxy, lower alkoxy, diethylaminoethoxy and simple amines such as amino, loweralkylamino, dialkylaminoalkylamino, diloweralkylamino and morpholino; $R_2$ is hydrogen, acetyl, lower alkyl, loweralkoxycarbonyl; $R_3$ is hydrogen, halogen, lower alkyl, trifluoromethyl, lower alkoxy; X is halo, loweralkoxy, diloweralkylamino, lower alkyl, loweralkylthio and the oxidation products of loweralkylthio; such as loweralkylsulfonyl and loweralkylsulfinyl where A is as above described.

Some representative preferred compounds of this invention are those listed below:

5-(p, o or m-fluorobenzylthio)-salicylic acid
5-(p, o or m-dimethylaminobenzylthio)-salicylic acid
4-(p, o or m-fluorophenylthiomethyl)-salicylic acid
5-(p, o or m-fluorobenzylsulfinyl)-salicylic acid
p, o or m-fluorophenyl 3'-carboxy-4'-hydroxyphenyldisulfide
5-[p, o or m-methylsulfonylbenzylsulfonyl]-salicylic acid.

We have found that the compounds of Formula I have anti-inflammatory activity and are effective in the prevention and inhibition of edema and granuloma tissue formation as shown by reduction of edema in the rat's foot induced by the injection of an inflammatory (phlogistic) agent into the rat's foot.

The compounds of the instant invention can be used to treat inflammation by reducing inflammation and relieving pain in such disesas as rheumatoid arthritis, osteoarthritis, gout, infectious arthritis and rheumatic fever.

The compounds of Formula I also have anti-pyretic, analgesic, diuretic, anti-fibrinolytic and hypo-glycemic activity and would be administered and used in the same manner and in the same dosage ranges as if they were being used to treat inflammation as discussed further on.

The treatment of inflammation in accordance with the method of the present invention is accomplished by orally administering to patients a composition of a compound of Formula I, particularly the especially preferred compounds in a non-toxic pharmaceutically acceptable carrier, preferably in tablet or capsule form.

The non-toxic pharmaceutical carrier may be, for example, either a solid or a liquid. Exemplary of solid carriers are lactose, corn starch, gelatin, talc, sterotix, stearic acid, magnesium stearate, terra alba, sucrose, agar, pectin, Cab-O-Sil and acacia. Exemplary of liquid carriers are peanut oil, olive oil, sesame oil and water. Similarly, the carrier or diluent may include a time delay material such as glyceryl monostearate or glyceryl distearate alone or with a wax.

Several pharmaceutical forms of the therapeutically useful compositions can be used. For example, if a solid carrier is used, the compositions may take the form of tablets, capsules, powders, troches or lozenges, prepared by standard pharmaceutical techniques. If a liquid carrier is used, the preparation may be in the form of a soft gelatin capsule, a syrup or a liquid suspension.

The active compounds of Formula I and of the compositions of this invention are present in an amount sufficient to treat inflammation, that is to reduce inflammation. Advantageously, the composition will contain the active ingredient, namely, the compounds of Formula I in an amount of from about 1 mg. to 100 mg. per kg. body weight per day (50 mg. to 7 g. per patient per day), preferably from about 2 mg. to 50 mg./kg. body weight per day (100 mg. to 3 g. per patient per day).

The method of treatment of this invention comprises internally administering to a patient (animal or human), a compound of Formula I, particularly an especially preferred compound admixed with a non-toxic pharmaceutical carrier such as exemplified above. The compounds of Formula I and particularly the especially preferred compounds will be present in an amount of from 1 mg. to 100 mg./kg. body weight per day, preferably from about 2 mg. to about 50 mg. per kilogram body weight per day and especially from 4 mg. to 20 mg./kg. body weight per day. The most rapid and effective anti-inflammatory effect is obtained from oral administration of a daily dosage of from about 4 to 20 mg./kg./day. It should be understood, however, that although preferred dosage ranges are given, the dose level for any particular patient depends upon the activity of the specific compound employed. Also many other factors that modify the actions of drugs will be taken into account by those skilled in the art in the therapeutic use of medicinal agents, particularly those of Formula I, for example, age, body weight, sex, diet, time of administration, route of administration, rate of excretion, drug combination, reaction sensitivities and severity of the particular disease.

Compounds of this invention may be prepared according to the following flow diagrams:

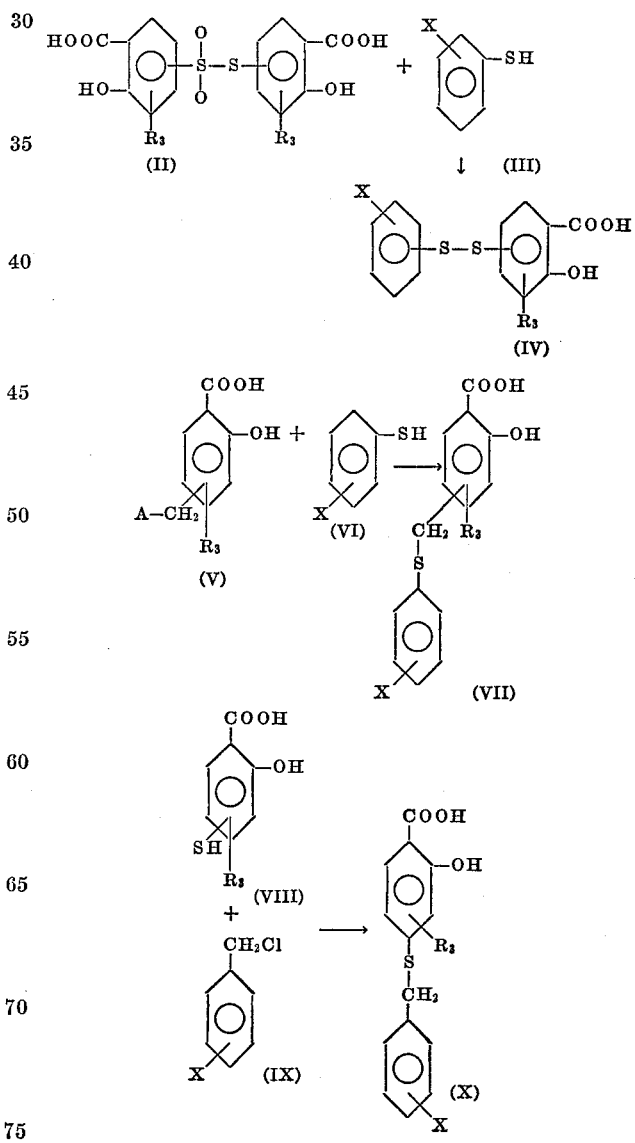

wherein X and $R_3$ are as above described and A is halo. Thus, if it is desired to prepare a substituted aryl disulfidephenyl carboxylic acid (Formula IV), a thiolsulfonate of Formula II can be reacted with a mercaptan or the sodium salt of the mercaptan (Formula III).

If a (substituted benzylthio) salicyclic acid is desired (Formula VII), a mercaptosalicylic acid of Formula III can be reacted with a substituted benzyl halide to form the desired product.

Finally, if a (phenylmercaptomethyl)-salicylic acid (Formula X) is desired, a (halomethyl)salicylic acid (Formula V) and a mercaptan or the sodium salt of the mercaptan (Formula VI) can be reacted to form the desired (benzylthio)-salicylic acid.

More specific reaction conditions are, of course, shown in the examples. If various derivatives of the acids of the Formulae IV, VII and X are desired (namely, the various compounds of Formula I), particularly those having substituents in the phenyl rings, they can be prepared from other derivatives having substituents different than those desired by conventional procedures known in the art. A few examples are included describing these procedures. Also various substituted compounds of Formula I wherein X and $R_3$ are as previously defined can be prepared by starting with the appropriately substituted starting materials.

The compounds of this invention wherein $R_1$ is a group such that an ester is the final compound (i.e., $R_1$ is alkoxy) are prepared by any esterification procedure using an esterifying agent containing the appropriate R group. For example, the salicylic acid compounds of this invention may be reacted with the appropriate lower alkanol (preferably methanol), in the presence of a strong acid such as HCl or sulfuric acid and the like to form the desired compound. The reaction may occur at room temperature over an extended period of time or at elevated temperatures.

The compounds of this invention wherein $R_1$ is a group such that an amide is the final compound (i.e., where $R_1$ is amino or substituted amino) may be prepared by any suitable amidation reaction. For example, the salicylic acid compound (preferably the methyl or ethyl ester) may be reacted with ammonia, ammonium hydroxide or an amine compound at any suitable temperature (room temperature to reflux). When the amino group is desired, it is preferred to carry out the reaction with ammonia in a bomb at temperatures about 100° C. to form the desired $R_1$ (amino) compound.

The salts of the final acid compound of this invention may be prepared by any of the well-known metathesis procedures. For example, the salicylic acid compound may be reacted with an inorganic base such as sodium hydroxide, potassium hydroxide etc. or with an amine such as diethylaminoethanol etc. and the like.

Following are a list of examples which describe this invention in greater detail. The examples should be construed as illustrations of the invention and not limitations.

EXAMPLE 1

5-(benzylthio)salicylic acid

To a mixture of 5-mercapto salicylic acid (0.061 m.) and methanol (132 ml.) is added anhydrous potassium carbonate (17.4 g., 0.125 m.), and the mixture stirred, protected from moisture, for 30 minutes, benzyl chloride (13.9 ml., 0.126 m.) added, and the resulting mixture refluxed for 5 hours. After cooling, a solution of potassium hydroxide (10.5 g.) in water (394 ml.), is added, the mixture heated on the steam cone one hour cooled, filtered, and the filtrate acidified with dilute hydrochloric acid, the mixture chilled, and the crude 5-benzylthiosalicylic acid collected. Recrystallization from benzene yields pure material, M.P. 148–150° C.

The above compound is also prepared via carbonation of p-(benzylthio)-phenol under Kolbe-Schmidt conditions in 59% yield (purified).

When o-, m- or p-fluorobenzyl chloride, o-, m- or p-chlorobenzyl chloride, α-chloro-o-, m- or p-xylene, o-, m- or p-bromobenzyl chloride, p-dimethylaminobenzyl chloride hydrochloride (using additional potassium carbonate), o-, m- or p-methoxybenzyl chloride, p-chloromethylphenyl methyl carbonate and its thiophenol analog, o-, m- or p-nitrobenzyl chloride, the (halomethyl)-biphenyls, the phenoxybenzyl chlorides, m-chloromethylacetophenone, p-benzylbenzylchloride, o-, m- or p-trifluoromethyl benzyl bromides, the (methylthio)benzyl chlorides, or methyl (chloromethyl)-benzoate are used in place of benzyl chloride above, the corresponding (substituted-benzylthio) salicylic acids are obtained.

When polysubstituted benzyl halides are used, as 2,3-, 2,4-, or 2,5-difluorobenzyl chloride, trimethoxybenzyl chloride, pentachlorobenzyl bromide, or tetrachlorobenzyl chloride, the corresponding (polysubstitutedbenzylthio) salicylic acids are obtained.

EXAMPLE 2

5-(p-fluorophenylmercaptomethyl) salicylic acid

When methyl 5-chloromethylsalicylate and p-fluorobenzenethiol are reacted together as per Example 1, 5-(p-fluorophenylmercaptomethyl) salicylic acid is obtained. This material has a melting point of 130–131° C.

When other substituted thiophenols, such as o- and m-fluorobenzenethiol, the thiocresols, p-trifluoromethylthiophenol, the methoxybenzenethiols, o-, m- and p-chlorobenzenethiol and the like are used in place of p-fluoro benzenethiol, above, the correspondingly substituted salicylic acids are obtained, respectively.

When methyl 4-chloro-5-chloromethylsalicylate, methyl 5-chloromethyl-4-methoxysalicylate, methyl-5-chloromethyl-4-methylsalicylate, methyl 5-chloromethyl-4-fluorosalicylate, or methyl 5-chloromethyl-3-trifluoromethylsalicylate (prepared via chloromethylation of the corresponding salicylate using the procedure of Bauer, C.A., 18, 3189 (1924)) is used in place of methyl 5-chloromethylsalicylate in the above procedures, the corresponding substituted salicylates are obtained.

EXAMPLE 3

5-(4'-fluorobenzylsulfinyl) salicylic acid (A) To a cooled solution of 0.01 mole of 5-(4'-fluorobenzylthio)salicylic acid in methanol-acetone is added a solution of 0.01 mole of sodium metaperiodate in a minimum amount of water, and the mixture stirred at or below room temperature until precipitation of sodium iodate is completed. The iodate is removed by filtration, the solvents removed in vacuo, and the residue taken up in chloroform and ether, the organic solvents combined, dried and concentrated. Purification is affected via column chromatography of the methyl ester, or by recrystallization of the acid, yielding 5-(4'-fluorobenzylsulfinyl)salicylic acid.

5-(4'-fluorobenzylsulfonyl) salicylic acid (B) When two equivalents of sodium metaperiodate are used in Example 3(A), and a higher temperature employed, or when the methylmercapto compound is oxidized with peroxide in acetic acid, there is obtained 5-(4'-fluorobenzylsulfonyl) salicylic acid.

Other routes to these compounds are known in the literature and prior art.

EXAMPLE 4

Methyl 5-(p-cyanobenzylthio) salicylate

A mixture of 0.02 mole of methyl 5-(p-bromobenzylthio) salicylate, 0.03 mole of cuprous cyanide and N-methylpyrrolidone is deaerated, covered with a nitrogen atmosphere and heated slowly to 180° C., kept at this temperature for 3 hours, allowed to cool, partitioned between benzene-7% hydrochloric acid containing ferric chloride (0.03 m.), the benzene layer separated, dried, concentrated and the residue chromatographed on a silica gel column using an ether-petroleum ether system as eluant (v./v. 5–80% ether) to yield methyl 5-(p-cyanobenzylthio) salicylate.

EXAMPLE 5

5-(p-carboxybenzylthio) salicylic acid

To a solution of potassium hydroxide (0.10 mole) in water (200 ml.) is added methyl [5-(p-carbomethoxybenzylthio] salicylate (0.02 m.), stirring, and the resultant mixture heated gently for solution, allowed to stir at room temperature for 5 hours, filtered, the pH of the filtrate adjusted with dilute hydrochloric acid, and the 5-(p-carboxybenzylthio) salicylic acid collected.

EXAMPLE 6

Methyl 5-(p-carbamylbenzylthio) salicylate

A mixture of methyl 5-(p-cyanobenzylthio) salicylate (0.02 m.) and polyphosphoric acid (50 ml.) is heated on a steam cone for 2 hours, cooled, added to water, the aqueous mixture extracted well with chloroform, the chloroform layer dried, filtered, and then concentrated in vacuo to yield crude methyl 5-(p-carbamylbenzylthio) salicylate, purified via column chromatography or recrystallization of the corresponding salicylic acid.

EXAMPLE 7

2-acetoxy-5-(p-fluorophenylmercaptomethyl) benzoic acid (A) To a mixture of 5-(p-fluorophenylmercaptomethyl) salicylic acid (0.04 m.) in anhydrous pyridine (15 ml.) is added acetic anhydride (28 ml.) and the resultant mixture heated on the steam cone for 1.5 hours. The mixture is kept free from moisture during this time. On cooling, the mixture is added to a stirred 500 ml. portion of water, the aqueous system extracted well with chloroform, the chloroform extracts washed with 1 N hydrochloric acid, water, and then dried over anhydrous magnesium sulfate. Concentration of the filtered solution yields 2-acetoxy-5-(p-fluorophenylmercaptomethyl) benzoic acid.

When propionic or butyric anhydride is used in place of acetic anhydride in the above example, the corresponding propionoxy or butyroxy compounds are obtained.

When the salicylic acids of Example 1 or 2 are used in place of 5-(p-fluorophenylmercaptomethyl) salicylic acid above, the corresponding acyloxybenzoic acids are obtained.

Methyl 2-carboxy-4-(p-fluorophenylmercaptomethyl) phenyl carbonate

To a mixture of 5-(p-fluorophenylmercaptomethyl) salicylic acid (0.01 ml.), dimethylaniline (0.02 m.) and benzene (30 ml.) is added methyl chloroformate (0.011 m.) over one hour with constant shaking and cooling. When the odor of the chlorocarbonate is essentially absent, hydrochloric acid (1 N, 100 ml.) is added and the mixture filtered. The benzene layer is separated, dried, filtered, the solvent removed in vacuo to yield methyl 2-carboxy-4-(p-fluorophenylmercaptomethyl)-phenyl carbonate.

EXAMPLE 8

Methyl 5-(p-fluorophenylmercaptomethyl) salicylate

To a solution of anhydrous methanol (100 ml.) containing ca. 0.5 g. of anhydrous hydrogen chloride (or concentrated sulfuric acid) is added 5-(p-fluorophenylmercaptomethyl) salicylic acid and the resultant mixture heated under reflux for several hours. The solvent is removed in vacuo, the residual material partitioned between chloroform-dilute sodium bicarbonate solution, and the layers separated. The chloroform layer is dried, filtered, and concentrated in vacuo to leave methyl 5-(p-fluorophenylmercaptomethyl) salicylate as an oil.

When ethanol is used in place of methanol in the above reaction, the corresponding ethyl ester is obtained.

When the salicylic acids of Example 1 or 2 are used in place of 5-(p-fluorophenylmercaptomethyl)salicylic acid in the above example, the corresponding methyl and ethyl esters are obtained.

Esterification is also achieved using diazomethane in methylene chloride solution.

EXAMPLE 9

Phenyl 5-(p-fluorophenylmercaptomethyl) salicylate

To a mixture of polyphosphate esters (15 equiv.) in chloroform is added one equivalent each of 5-(p-fluorophenylmercaptomethyl)salicylic acid and phenol, and the resultant mixture heated gently for 30 minutes. The chloroform mixture is cooled, washed with dilute bicarbonate solution, the chloroform layer dried, filtered and evaporated in vacuo to yield phenyl 5-(p-fluorophenylmercaptomethyl)salicylate.

When the salcylic acids of Examples 1 and 2 are used in place of 5-(p-fluorophenylmercaptomethyl)salicylic acid in the above reaction, the corresponding phenyl esters are obtained.

EXAMPLE 10

5-(p-fluorophenylmercaptomethyl)salicylamide

A mixture of methyl 5-(p-fluorophenylmercaptomethyl) salicylate and concentrated ammonium hydroxide (>fivefold excess) is heated at 100° C. in a sealed tube for six hours. After cooling, water is added and the 5-(p-fluorophenylmercaptomethyl)salicylamide collected.

When monomethylamine, dimethylamine, ethylamine, diethylamine, morpholine, piperidine, etc. are used in place of ammonium hydroxide, the corresponding amides are obtained.

Also similar amides can be obtained by using the appropriate amine and the various starting materials of Example 1 or 2.

EXAMPLE 11

Sodium 5-(p-fluorophenylmercaptomethyl) salicylate

Solutions of 5-(p-fluorophenylmercaptomethyl)salicylic acid in methanol and sodium hydroxide (1 equiv.) in water are mixed, heated for solution, filtered, and the filtrate concentrated in vacuo to leave sodium 5-(p-fluorophenylmercaptomethyl)salicylate.

When potassium hydroxide is used in place of sodium hydroxide in the above example, the corresponding potassium salt is obtained.

When two equivalents of the above bases are used, the corresponding disodio- and dipotassio-salts are obtained.

EXAMPLE 12 p-(Methoxymethyl)-benzyl chloride and 5-[p-(methoxymethy)-benzylthio] salicylic acid A mixture of benzyl methyl ether (24.4 g.) and 40% formaldehyde (18 g.), at 5° C. is saturated with a rapid stream of hydrogen chloride, stirring, and stirred cold for 2 hours. After addition to cracked ice, the mixture is extracted with ether, the ether layer dried, concentrated in vacuo, and the residue distilled rapidly in vacuo to yield p-(methoxymethyl)-benzyl chloride.

When benzylmethylsulfide is reacted as above, p-(methylthiomethyl)-benzyl chloride is obtained.

When these benzyl chlorides are reacted with 5-mercaptosalicylate as per Example 1, 5-(p-methoxymethyl)-benzylthio-salicylic acid and 5-(p-methylthiomethyl)-benzylthio-salicylic acid are obtained.

EXAMPLE 13

5-(p-hydroxybenzylthio)salicylic acid

A mixture of [4-(α-3-carbomethoxy-4-hydroxyphenylthio)-tolyl] methyl carbonate (0.02 m.), sodium hydroxide (0.1 m.) and water (100 ml.) is stirred and heated gently for solution, allowed to stir at ambient temperatures for 5 hours, filtered, and acidified to yield 5-(p-hydroxybenzylthio)salicylic acid.

When the thiol analog is hydrolyzed as above, the corresponding thiol compound 5 - (p - mercaptobenzylthio) salicylic acid is obtained.

EXAMPLE 14

Methyl 5-(p-aminobenzylthio)-salicylate

A mixture of pure methyl 5-(p-nitrobenzylthio)-salicylate (0.01 m.) in methanol-dioxane (1:1) (ca. 200 ml.) is reacted with hydrogen at room temperature (40 p.s.i.) in the presence of 10% Pd/C (1.0 g.) stopping the uptake of hydrogen at theory. The mixture is filtered, the cake washed well with methanol, the filtrate evaporated in vacuo, the residue chromatographed on a silica gel column using a methanol-methylene chloride system (v./v. 0–30% methanol) as eluant to yield methyl 5-(p-aminobenzylthio)-salicylate.

EXAMPLE 15

5-(p-benzyloxybenzylthio)-salicylic acid

A mixture of 5-(p-hydroxybenzylthio)salicylic acid (0.01 m.), anhydrous potassium carbonate (0.02 m.), and anhydrous methanol (50 ml.) is stirred for ca. 30 minutes protected by a calcium chloride drying tube. Benzyl chloride (0.02 m.) is added, the mixture refluxed for 6 hours, potassium hydroxide (2 g.) and water (100 ml.) added, the mixture refluxed one hour, filtered cold, acidified with dilute hydrochloric acid, the acid collected and purified via recrystallization or chromatography of its methyl ester to yield 5-(p-benzyloxybenzylthio) salicylic acid.

EXAMPLE 16

5-(p-[methylsulffinyl]-benzylsulfinyl)salicylate

When methyl 5-(p-methylthiobenzylthio)salicylate is reacted with sodium metaperiodate as per the procedure of Example 3, using two equivalents of metaperiodate below room temperature, there is obtained 5-(p-[methylsulfinyl]-benzylsulfinyl)salicylate.

Using one equivalent of metaperiodate, followed by chromatography of the reaction mixture, methyl 5-(p-[methylsulfinyl]-benzylthio)-salicylate is obtained.

When four equivalents of metaperiodate are used, or if hydrogen peroxide in acetic acid is used and the reaction carried out at about 50° C., the bis-sulfonyl derivative is obtained.

EXAMPLE 17

2-acetoxy-5-(p-acetoxybenzylthio)benzoic acid

When 5-(p-hydroxybenzylthio)salicylic acid is reacted with excess acetic anhydride and pyridine as per Example 7, there is obtained 2-acetoxy-5-(p-acetoxybenzylthio)-benzoic acid.

When 5-(p-aminobenzylthio)-salicylic acid is used, 2-acetoxy-5-(p-acetamidobenzylthio)-benzoic acid is obtained. Mild basic hydrolysis of this yields 5-(p-acetamidobenzylthio)-salicylic acid.

EXAMPLE 18

4-carboxyl-3-hydroxyphenyl 4'-fluorophenyl disulfide

A solution of p-fluorobenzenethiol (0.01 m.) in ethanol is added to a mixture of salicylic acid-5-disulfoxide in ethanol (100 ml.) and the resulting mixture allowed to stir for six hours. The majority of ethanol is then evaporated in a nitrogen atmosphere, water (50 ml.) is added, and the resultant 4-carboxy-3-hydroxyphenyl 4'-fluorophenyl disulfide collected.

When other substituted benzene thiols, such as o- and m-fluorobenzenethiols, o-, m-, or p-chlorobenzenethiols, o-, m- and p-tolylthiols, m-trifluoromethylbenzenethiols, o-, m- or p-methoxybenzenethiols, or methyl p-mercaptobenzoate, etc. are used in place of p-fluorobenzenethiol, above, the correspondingly substituted disulfide is obtained.

Various esters, acetates, amides and salts of the salicylic acids obtained above can be prepared by reacting the salicylic acids with the appropriate agents according to Examples 7, 8, 9, 10 and 11 to form the desired end products.

EXAMPLE 19

Methyl 5-(p-fluorophenylsulfonylmethyl) salicylate

To 0.5 g. of methyl 5-(p-fluorophenylmercaptomethyl) salicylate (Example 8) in acetic acid is added 1.5 g. of hydrogen peroxide. The reaction mixture is placed in a water bath at 55° C. The bath being heated slowly to about 80° C. over a 1½ hour period. The reaction mixture is maintained at 80° C. for about one hour and then heated directly on a steam cone for about two hours. The reaction mixture is then added to 75 ml. of stirred ice water. A white precipitate which forms is filtered and dried. The material is then recrystallized from benzene to yield 280 mg. of methyl 5-(p-fluorophenylsulfonylmethyl) salicylate, M.P. 151.5–153° C.

5-(p-fluorophenylsulfonylmethyl) salicylic acid can be prepared by following the above procedure but using an equivalent amount of 5-(p-fluorophenylmercaptomethyl) salicylic acid (Example 2) in place of methyl 5-(p-fluorophenylmercaptomethyl) salicylate.

EXAMPLE 20

5-(p-fluorophenylsulfonylmethyl)salicylic acid 0.8 g. of 5-(p-fluorophenylmercaptomethyl)salicylic acid in 80 cc. of a 1:1 acetone/methanol is stirred under ice cooling. 1 g. of NaIO₄ in water is added. The mixture is stirred in the cold for two hours and kept at room temperature overnight. A precipitate forms which is then filtered. The filtered material is added to 50 ml. of water. Any acetone/methanol is then blown off with nitrogen. The solid material is then filtered and washed with water to yield 5 g. of a grey solid. This solid is then taken up in 25 cc. of acetone, heated, filtered and added to 75 ml. of benzene. The benzene is concentrated to 40 ml. and cooled. After standing overnight and aging for 3 hours and displacing the benzene with petroleum ether, 468 mg. of 5-(p-fluorophenylsulfonylmethyl) salicylic acid is isolated having a melting point of 156–157° C.

We claim:

1. A compound of structural formula:

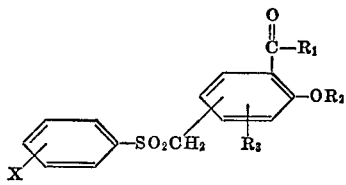

or a pharmaceutically acceptable non-toxic salt, wherein
$R_1$ is hydroxy or lower alkoxy;
$R_2$ is hydrogen or lower alkanoyl;
$R_3$ is hydrogen, halo, halo-lower alkyl, lower alkyl or $C_{3-7}$ cycloalkyl; and
X is hydrogen, halo or halo-lower alkyl; and
wherein the —$SO_2CH_2$— group is attached to the 4- or 5-position of the salicylic moiety.

2. The compound of claim 1, wherein $R_3$ is hydrogen.
3. The compound of claim 1, wherein X is halo and $R_3$ is hydrogen.
4. The compound of claim 1, which is 4- or 5-(fluorophenylsulfonylmethyl)salicylic acid.

References Cited

UNITED STATES PATENTS

| | | | |
|---|---|---|---|
| 2,077,529 | 4/1937 | Modersohn | 260—520 |
| 3,105,090 | 9/1963 | Leonard | 260—521 R |

FOREIGN PATENTS

| | | | |
|---|---|---|---|
| 471,125 | 8/1937 | England | 260—520 |

OTHER REFERENCES

March: "Adv. Organic Chemistry," McGraw-Hill Book Co. (1968), p. 887.

Cram et al.: "Organic Chemistry," McGraw-Hill Book Co., Inc. (1959), p. 440.

LORRAINE A. WEINBERGER, Primary Examiner

J. F. TERAPANE, Assistant Examiner

U.S. Cl. X.R.

260—247.1, 293.73, 326.3, 463, 465 D, 470, 479 R, 507 R, 516, 556 C, 559 T; 424—248, 267, 274, 301, 303, 304, 308, 311, 317, 321, 324